United States Patent
Hasan et al.

(10) Patent No.: US 8,271,151 B2
(45) Date of Patent: Sep. 18, 2012

(54) FLIGHT CONTROL SYSTEM FOR ROTARY WING AIRCRAFT

(75) Inventors: Muhammad Emadul Hasan, Hamden, CT (US); Donald W. Fowler, Oxford, CT (US); Pengju Kang, Yorktown Heights, NY (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1205 days.

(21) Appl. No.: 12/060,119

(22) Filed: Mar. 31, 2008

(65) Prior Publication Data

US 2012/0072056 A1   Mar. 22, 2012

(51) Int. Cl.
- *G01C 23/00* (2006.01)
- *G05D 1/00* (2006.01)
- *G05D 3/00* (2006.01)

(52) U.S. Cl. .......................................................... 701/3

(58) Field of Classification Search ....... 701/3; 244/178
See application file for complete search history.

(56) References Cited

U.S. PATENT DOCUMENTS

| | | | |
|---|---|---|---|
| 4,626,998 A * | 12/1986 | Adams et al. ................... 701/4 |
| 4,696,445 A | 9/1987 | Wright et al. |
| 4,770,375 A | 9/1988 | Lappos |
| 4,924,400 A | 5/1990 | Post et al. |
| 5,076,517 A | 12/1991 | Ferranti et al. |
| 5,156,363 A | 10/1992 | Cizewski et al. |
| 5,428,543 A | 6/1995 | Gold et al. |
| 5,553,812 A | 9/1996 | Gold et al. |
| 5,853,152 A * | 12/1998 | Evans et al. ................... 244/221 |
| 6,012,676 A | 1/2000 | Gold et al. |
| 6,145,428 A | 11/2000 | Gold et al. |
| 6,290,171 B1 | 9/2001 | Dequin et al. |
| 6,325,331 B1 * | 12/2001 | McKeown ................. 244/76 A |
| 6,390,412 B1 | 5/2002 | Stevens |
| 6,648,269 B2 | 11/2003 | Gold et al. |
| 6,695,264 B2 | 2/2004 | Schaeffer et al. |
| 7,098,811 B2 | 8/2006 | Augustin et al. |
| 7,126,496 B2 | 10/2006 | Greene |
| 2008/0234881 A1 * | 9/2008 | Cherepinsky et al. ............ 701/7 |

* cited by examiner

*Primary Examiner* — Mary Cheung
*Assistant Examiner* — Michael D Lang
(74) *Attorney, Agent, or Firm* — Carlson, Gaskey & Olds PC (57) ABSTRACT

A flight control system and method includes a control loop control law to bias the collective stick toward a trim reference position with a motor and generate a force gradient with a clutch.

21 Claims, 12 Drawing Sheets

FLIGHT CONTROL SYSTEM FOR ROTARY WING AIRCRAFT

BACKGROUND

The present invention relates to a flight control system, and more particularly to a flight control system for a rotary wing aircraft.

Flight control systems for rotary wing aircraft typically employ: a cyclic stick for commanding the aircraft's pitch and roll, pedals for commanding directional yaw, and a collective stick to control the vertical rate. Fly by wire aircraft typically utilize active controllers which provide force cueing capability along with providing the pilot commands to the control system. The active controller denotes the ability to directly provide cueing forces to a control input inceptor grip from an electronically computed source related to the effect the controller is having on the aircraft. The force cueing aspects of such active controllers are typically complex, require fault criticality considerations and management, and are therefore more expensive than a simple conventional displacement stick type controller.

The collective control stick typically is connected to an actuation device that provides minimal tactile feedback. The manual displacement of the control stick may not provide sufficient or accurate perception of the extent of collective pitch input, the effect on the aircraft vehicle loads and systems or of the amount of collective pitch reserve available. The reduced physical cues provided by a displacement type collective control stick may not be particularly well suited to aircraft which must perform in a flight profile where tactile feedback is of significant importance, such as nap-of-the-earth flight. The pilot may thereby rely in part upon secondary cues within the cockpit, such as torque or collective position indicators.

Conventional displacement type collective sticks typically utilize trim motors connected in series to a spring to control the stick position. When the conventional displacement type collective stick is moved away from a reference set by the trim motor, a return force is provided by the spring. The return force may be accompanied by a damping force device.

The conventional displacement type collective stick is pivotally connected to a fixed point within the aircraft cockpit which facilitates movement about a large radius such that tactile feedback is essentially linear. This essentially linear motion reduces pilot fatigue and facilitates operation of the various push-button controls positioned on the face of the collective grip. The spring gradient may be accompanied by an initial trim detent or breakout force and damping force. The spring and detent forces enable return to trim if the pilot relaxes his force on the stick and also enables the automatic flight control system to control the position of the stick when the pilot does not provide the positioning function.

While conventional displacement type collective sticks offer the pilot the desired physical displacement and rate damping cues, modern aircraft tend to desire additional control stick cues that are difficult if not impossible to implement with the trim spring plus damping mechanical approach. To improve the force cueing capability, force sensors have been added to the conventional displacement type collective stick actuation. Although relatively effective, such conventional displacement type collective sticks may have disadvantageous weight characteristics. Furthermore, it may be difficult to command an artificial cueing force directly that may not be related to the position of the control stick. This is why the trend is toward the active controller methodology for Fly-By-Wire systems where cueing force can be directly commanded by the electronic control system.

Another significant method of cueing force is the use of a force-generating hydraulic cylinder which is commanded by a digital computer. While the cylinder does provide generalized force cueing capability, it too may have disadvantageous weight characteristics and may introduce a high force and high rate failure characteristics which must be accommodated through redundant hardware design and software criticality considerations.

In one conventional trim motor and spring trim system, a motor positions one end of a trim gradient spring while the other end connects to the stick through an electrically controlled engage clutch. The nature of the engage clutch is that no slippage is permitted such that the pilot moves the stick by compressing/stretching the spring. Since the spring stores energy when compressed and since there is typically a high gear ratio to the motor and clutch to reduce torque design parameters, clutch release dissipates stored energy thru inertia acceleration of the gear train such that the result causes some stick jump as perceived at the pilot's hand. Furthermore, the compression of the relatively soft spring may complicate or prevent the command of significant cueing forces to the pilot because a large deflection of the spring or large detent spring preload would be required. Both of these may lead to undesirable operational characteristics and severely limit the cueing capability of the conventional trim motor-spring type actuation systems.

Modern control systems also apply a technology of "active controller" systems as part of the pilot control input inceptor system. Such active controllers have the capability to control position and force applied to the control stick and meet the requirements for generalized force cueing. However, such systems may have large force and motion failure modes which necessitates that hardware and software design criticality be addressed. Therefore, while the stick-actuator-inceptor hardware is effective, a higher level of criticality and therefore redundancy in the control hardware and software system design may be necessitated.

SUMMARY

A flight control system according to an exemplary aspect of the present invention includes: a control inceptor; control inceptor; a clutch engageable with said control inceptor; a motor engageable with said control inceptor; and a module comprising a trim reference control law in communication with a control loop control law, said trim reference control law operable to generates a trim reference position for said control inceptor, said trim reference position utilized by said control loop control law to control a speed of said control inceptor toward said trim reference position with said motor and generate a force gradient with said clutch.

A method of flight control according to an exemplary aspect of the present invention includes: recording a current position of a control inceptor as a trim reference position; generating a clutch command to hold the control inceptor at the trim reference position; and generating a motor speed command in response to movement of the control inceptor from the trim reference position.

BRIEF DESCRIPTION OF THE DRAWINGS

The various features and advantages of this invention will become apparent to those skilled in the art from the following detailed description of the disclosed non-limiting embodiment. The drawings that accompany the detailed description can be briefly described as follows.

DETAILED DESCRIPTION OF THE EXEMPLARY EMBODIMENTS

Figure 1:
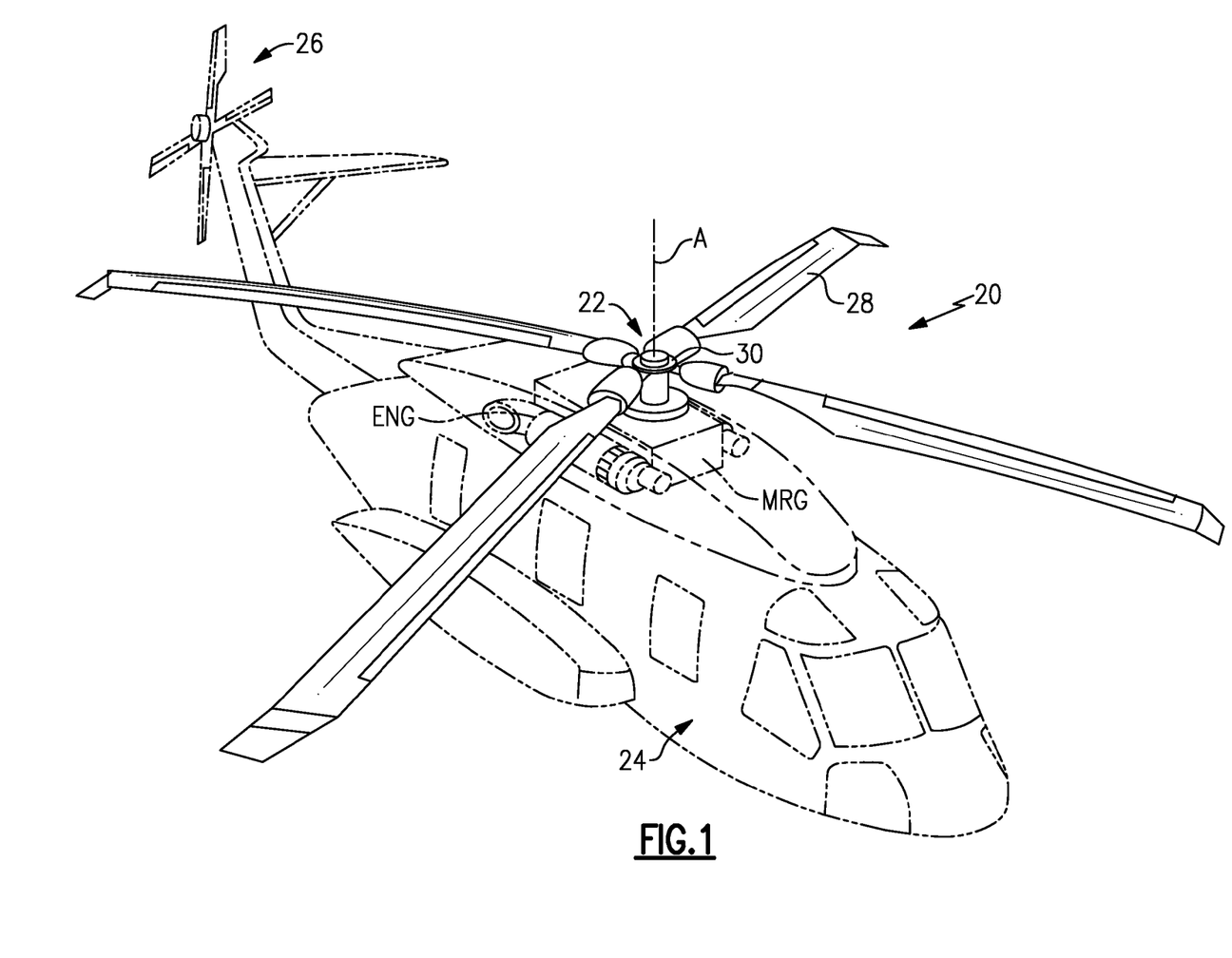
FIG. 1 is a perspective view of one exemplary rotary wing aircraft.

FIG. 1 schematically illustrates an exemplary vertical take-off and landing (VTOL) rotary-wing aircraft 20. The aircraft 20 in the disclosed, non-limiting embodiment includes a main rotor system 22 supported by an airframe 24 having an extending tail which mounts an anti-torque system 26 such as a tail rotor system. The main rotor assembly 22 is driven about an axis of rotation A through a main rotor gearbox MRG by one or more engines ENG. The main rotor gearbox MRG may be interposed between the one or more engines ENG, the main rotor system 22 and the anti-torque system 26. The main rotor gearbox MRG is mechanically connected to the main rotor system 22 and to the anti-torque system 26 so that the main rotor system 12 and the anti-torque system 16 may both driven by the main rotor gearbox MRG. The main rotor system 12 includes a multiple of rotor blades 28 mounted to a rotor hub 30. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2A:
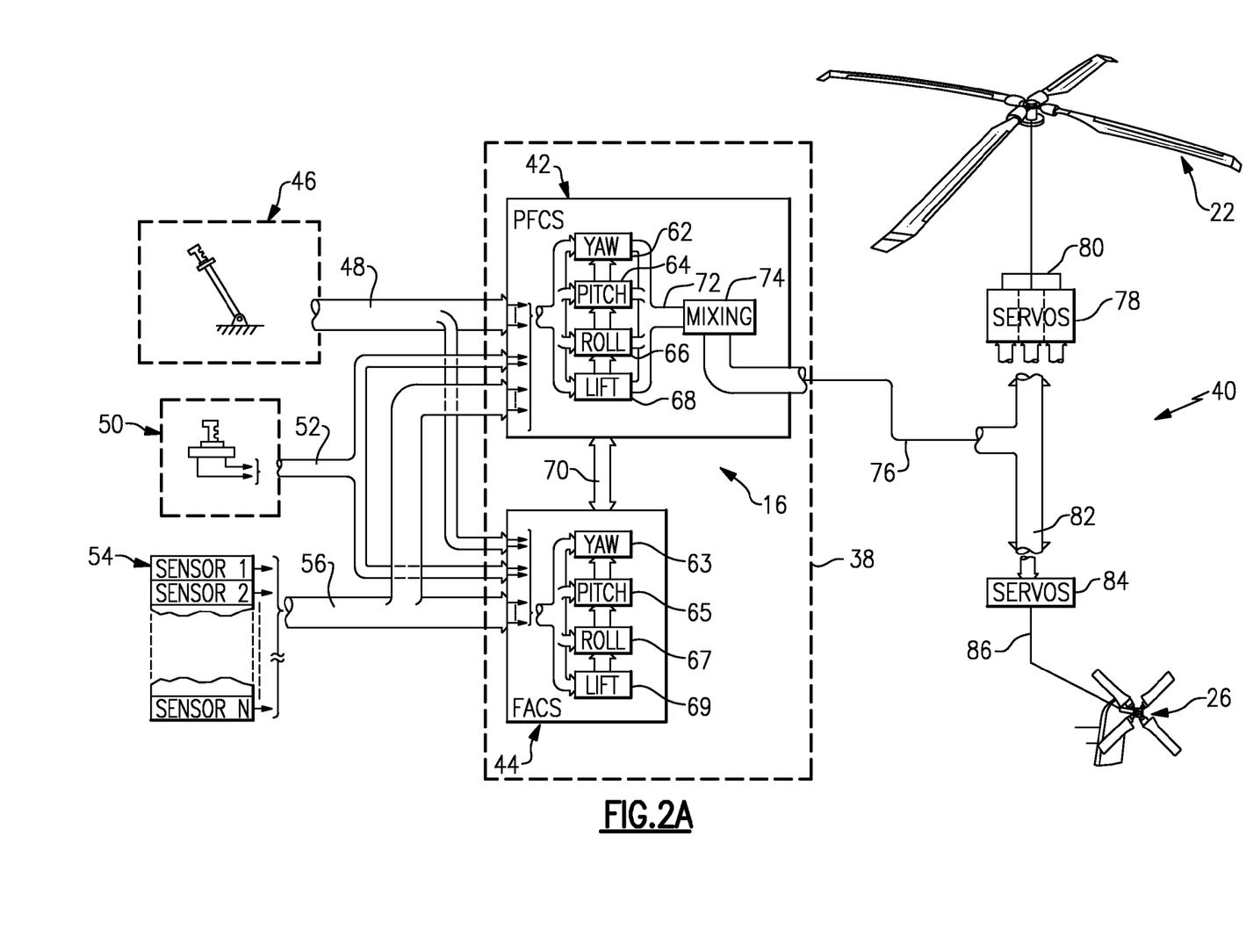
FIG. 2A is a block diagram of a non-limiting embodiment of an exemplary model following flight control system.
Figure 2B:
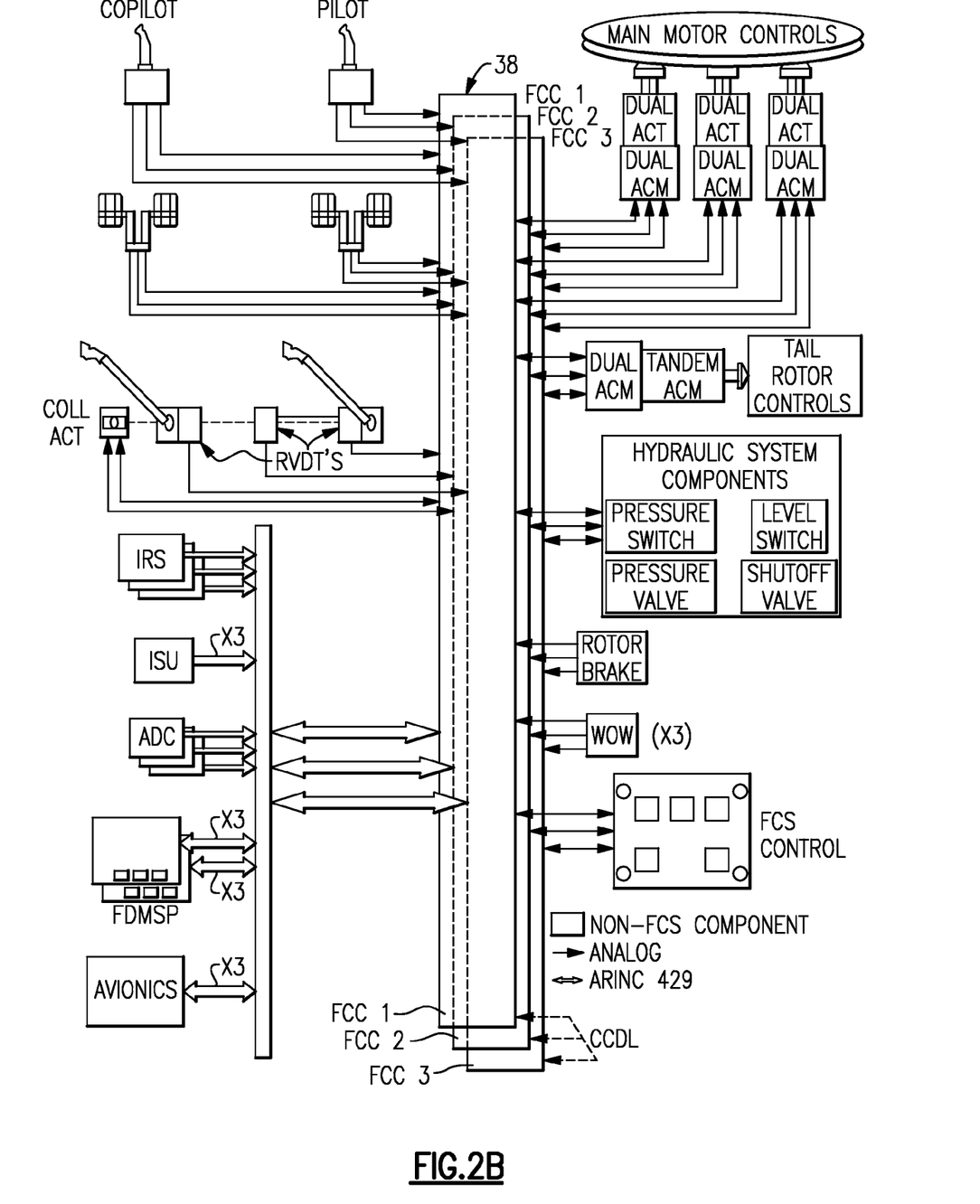
FIG. 2B is a block diagram of the integration of a fly-by-wire flight control system.

Referring to FIG. 2, a fly-by-wire type flight control system 40 includes a model following control system which shapes the pilot's controller and displacement commands through an inverse vehicle model to produce the desired aircraft response. The system 40 may, in one non-limiting embodiment include a Flight Control Computer (FCC) 38 (FIG. 2B). The FCC 38 generally includes a Primary Flight Control System (PFCS) 42 and an Automatic Flight Augmentation and Cuing System (FACS) 44. The PFCS 42 and FACS 44 execute explicit model following control laws to provide both control and stability augmentation. In this control law architecture, pilot commands are shaped directly into desired aircraft responses. These desired commands are then passed through an inverse aircraft model to obtain the control commands required to produce the desired response. The difference between the desired command and the aircraft response is also fed back to drive these errors towards zero, thus improving the model following performance.

The PFCS 42 and FACS 44 each receive the force output command signals of a collective controller 46 on line 48, a cyclic controller 50 on line 52, and the aircraft's sensed parameter signals from sensors 54, on lines 56. The collective controller 46 and the cyclic controller 50 may take various forms including sidearm controllers, a yaw pedal system or other such flight controllers.

The PFCS 42 and FACS 44 may each contain separate flight control laws for controlling the yaw, pitch, roll and lift axes of the aircraft. The logic is included in the PFCS and FACS control modules (schematically represented by blocks 62, 64, 66, 68 for the PFCS 42 and blocks 63, 65, 67, 69 for the FACS 44). The sensed parameter signals from aircraft sensors 54, on lines 56, provide the PFCS and FACS with the aircraft's angular rate and attitude response to the rotor command signals. The PFCS logic provides rotor command signals and the FACS logic provides conditioning and/or trimming of the PFCS four axis logic functions to provide, for example only, autopilot capabilities. The PFCS and FACS logic modules interconnect through bus 70 to provide rotor command signals on output lines 72 to a mixing function 74 which communicates commands on lines 76 for the displacement of the main rotor servos 78 and linkages 80 to control the tip path plane of the main rotor 22. A mixed command signal is also provided on line 82 to the tail rotor servos 84 to control the thrust of the anti-torque system 26 through linkages 86.

Figure 3:
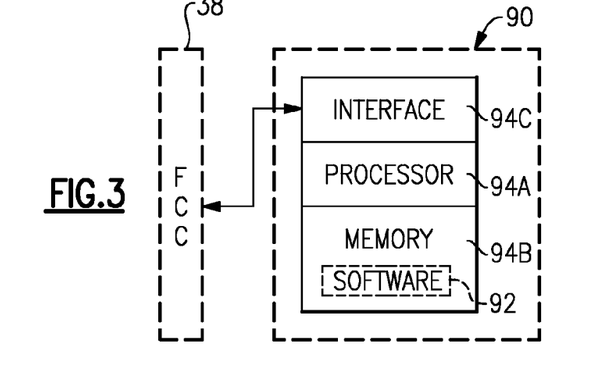
FIG. 3 is a schematic block diagram of a module which executes a collective trim actuator algorithm (CTA)

Referring to FIG. 3, a module 90 (see also FIG. 4) executes a collective trim actuator algorithm (CTA) 92. The functions of the algorithm 92 are disclosed in terms of functional block diagrams, and it should be understood by those skilled in the art with the benefit of this disclosure that these functions may be enacted in either dedicated hardware circuitry or programmed software routines capable of execution in a microprocessor based electronics control embodiment. In one non-limiting embodiment, the module 90 may be a portion of a flight control computer, a portion of a central vehicle control, an interactive vehicle dynamics module, a stand-alone line replaceable unit or other system. The non-limiting embodiment disclosed herein is applied to a collective system but could also be applied to any control axis depending on the type of system and any control inceptor such as a stick or pedal system.

The module 90 typically includes a processor 94A, a memory 94B, and an interface 94C. The processor 94A may be any type of known microprocessor having desired performance characteristics. The memory 94B may, for example only, includes UVPROM, EEPROM, FLASH, RAM, ROM, DVD, CD, a hard drive, or other computer readable medium which stores the data and control algorithms described herein. The interface 94C facilitates communication with the FCC 38, as well as other avionics and systems.

Figure 4:
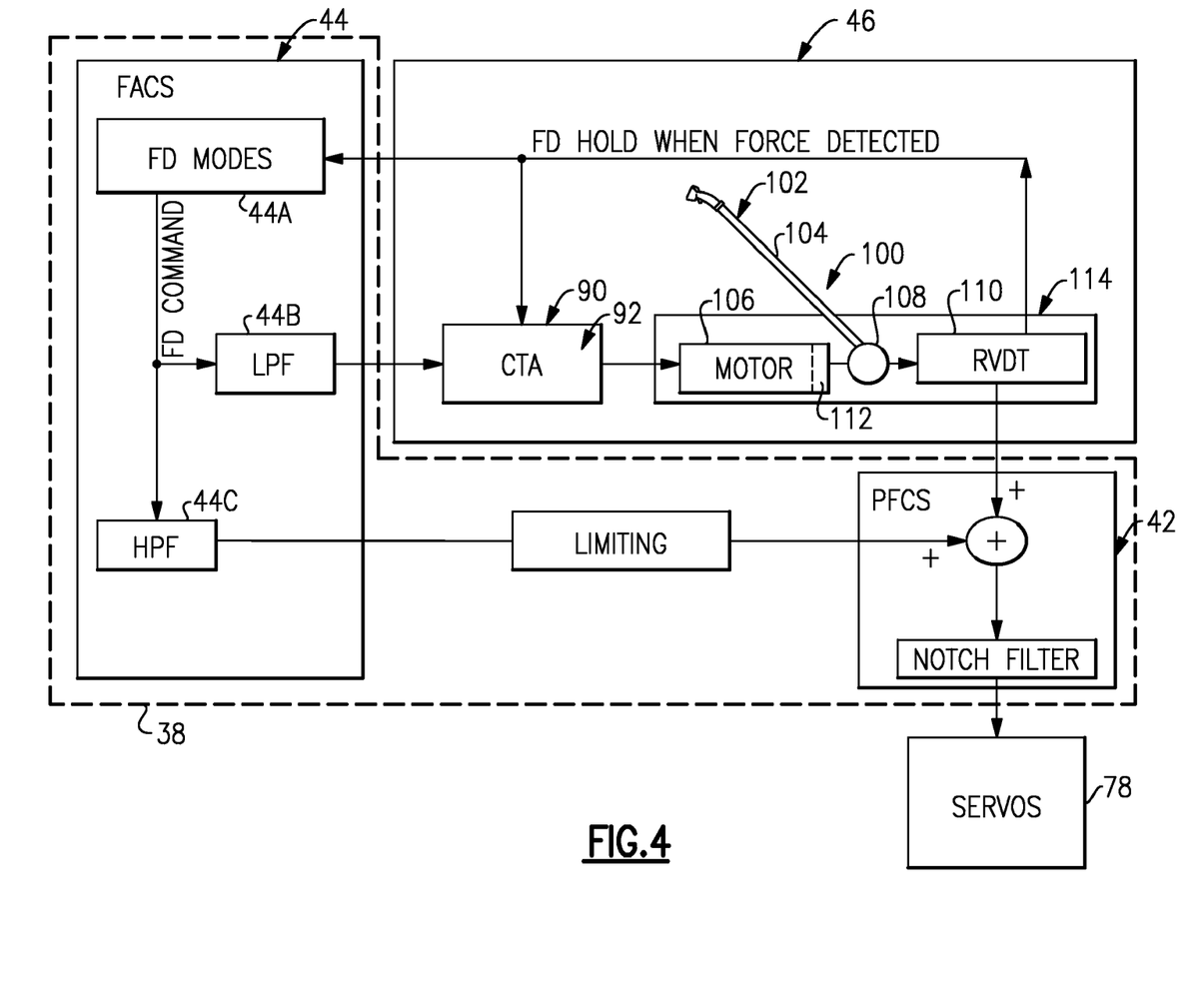
FIG. 4 is a schematic block diagram of a module which executes a collective trim actuator algorithm (CTA) integrated within a model following flight control system.

Referring to FIG. 4, the module 90 communicates with a collective stick 100, the PFCS 42 and the FACS 44 to drive the main rotor servos 78. In the disclosed non-limiting embodiment of a Fly-By-Wire flight control system, collective is controlled by a displacement type collective control stick whereas the cyclic and pedals are implemented by a force-sensing system. However, it should be understood that the cyclic and/or pedals may alternatively or additionally be implemented as displacement type controls as disclosed herein. The collective stick 100 operates as a generally closed system in terms of stick position. The current stick position is read in by the separate PFCS control laws 62, 64, 66, 68 and the main rotor servos 78 are commanded relative to the collective stick position.

Figures 5, 6:
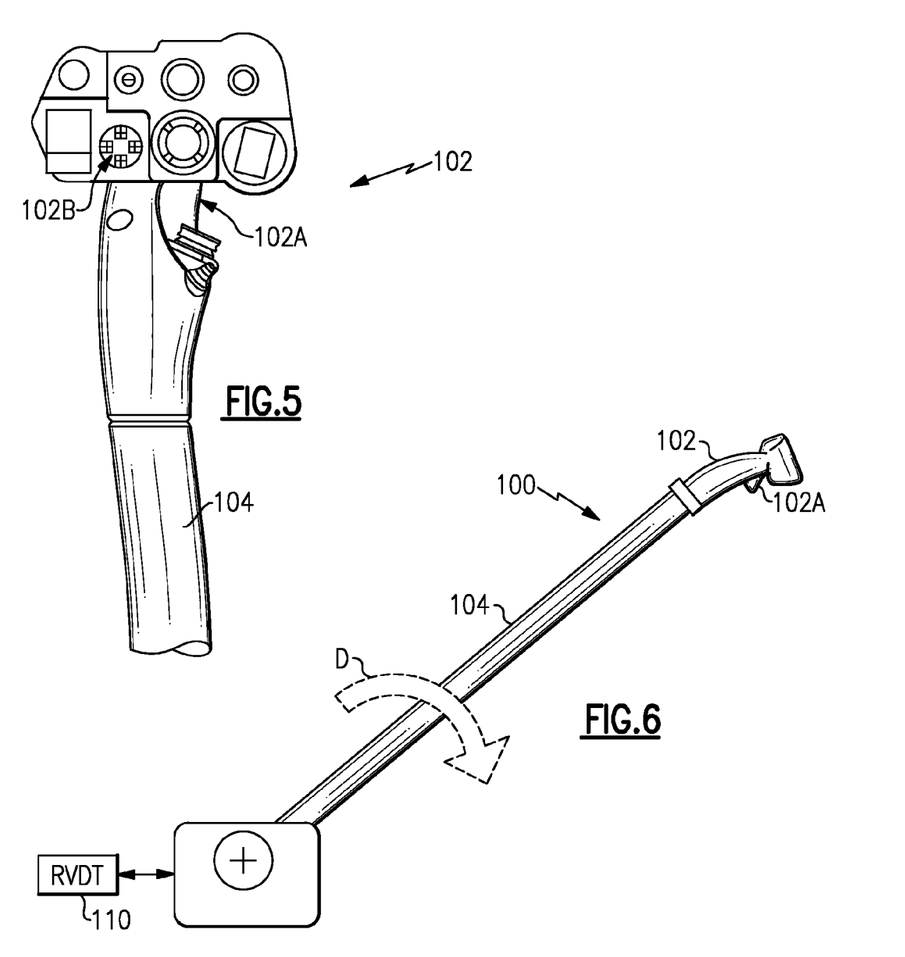
FIG. 5 is a schematic view of collective stick grip.
FIG. 6 is a schematic view of a collective stick illustrating angular motion thereof.

The collective stick 100 includes a grip 102 (FIG. 5) mounted to an arm 104 driven by a motor 106 through a clutch 108. A sensor 110 such as a Rotary Variable Differential Transformer (RVDT) generates an output that is linearly proportional to the angular displacement D of the collective stick 100 (FIG. 6). The motor 106 and the clutch 108 are attached to the arm 102 at a point from which the travel of the collective stick 100 may be controlled. In one non-limiting embodiment, the motor 106 may be a rate command loop based device controlled through a rate feedback tachometer 112. The tachometer 112 may also be utilized to determine a run-away condition of the motor 106.

The module 90, the motor 106, the clutch 108, the sensor 110 and the tachometer 112 may be provided as a spring-less motor-clutch electro-mechanical drive system 114 which supports the arm 104 within the aircraft cockpit. The algorithm 92 provides a feel approximation of a mechanical spring-biased collective system through the electro-mechanical drive system 114 such that the collective stick 100 provides a smooth, intuitive feel with a force feedback through the clutch 108 and the motor 106. The collective stick 100 also provides a subjective force ability via the clutch 108 so as to cue the pilot for events other than stick motion as will be further described below.

The clutch 108 enables slippage in proportion to the system clutch engagement command. This way, the cueing force is more directly controllable by the CTA 92, avoids stored energy dissipation and jump problems, and enables a limited rate motor drive that does not require expensive and/or redundant system designs. The clutch 108 provides a variable slippage versus applied stick force controlled in proportion to the commanded clutch engagement from the CTA 92. The command is typically a current level that causes the torque transmitted through the clutch 108 to vary in proportion to the current level in the clutch circuit. The details of the clutch 108 itself are not the subject of invention, however, the method and procedures to control the clutch torque to provide effective force cues to the pilots are integral parts of the present invention and provided through the CTA 92.

The module 90 communicates with the FACS 44 to drive the main rotor servos 78 through the PFCS 42. The FACS 44 typically includes a multiple of autopilot flight director modes 44A, such as, for example only, altitude hold, attitude hold, and hover hold. A low pass filter 44B communicates with the module 90 while a high pass filter 42C communicates with the PFCS 42. The filters 44B, 44C define, in part, rate limits communicated to the collective stick 100. For example only, should the FACS 44 generate a lift rate command above a speed capability of the motor 106 or other rate limit set by the filters 44B, 44C, the rate lift command is passed directly to the PFCS 44 without associated movement of the collective stick 100. That is, should for example, a strong wind gust require a strong response by the FACS 44, the rate lift command from the FACS 44 will be input to the PFCS 42 without the pilot receiving a correspondingly sharp collective stick 100 movement. Conversely, should the FACS 44 generate a lift rate command below the speed capability of the motor 106 or other rate limit set by the filters 44B, 44C, the lift rate command will be communicated to the motor 106 such that the collective stick 100 moves in accords therewith. This facilitates a force feel approximation to the pilot such that the collective stick 100 provides a smooth, intuitive feel which facilitates operation in tactile feedback important flight profiles. That is, the module 90 generates a force cue, but not a rapid collective stick runaway.

In one non limiting embodiment, the motor 106 may accept rate commands from −10%/s to +10%/s where % defines the percent of collective stick travel. The clutch 108 engages the motor 106 to produce a desired frictional force to the collective stick 100. In one non-limiting embodiment, the motor 106 interacts with the clutch 108 such that some amount of clutch engagement is required for the motor 106 to move the collective stick 100. The friction felt at the collective stick 100 may be directly proportional to the amount of clutch command 108 engaged and, for example only, the clutch commands range from 0 to 100 percent.

The grip 102 may include, in one-non-limiting embodiment, one or more discrete functional switches 102A, 102B (FIG. 5). A trim release 102A in one non-limiting embodiment, may be located under the grip 102 as a spring loaded trigger which is spring biased when not actuated outward. The trim release operates as a master switch for the motor 106 and the clutch 108 which forces the motor command 134 and clutch command 132 to zero. A multi-position switch (beeper) 102B in one non-limiting embodiment, may be located on the grip 102 to actuate or "beep" the collective stick up or down at a slow speed to slowly and accurately position the control stick for high fidelity lift control.

Figure 7:
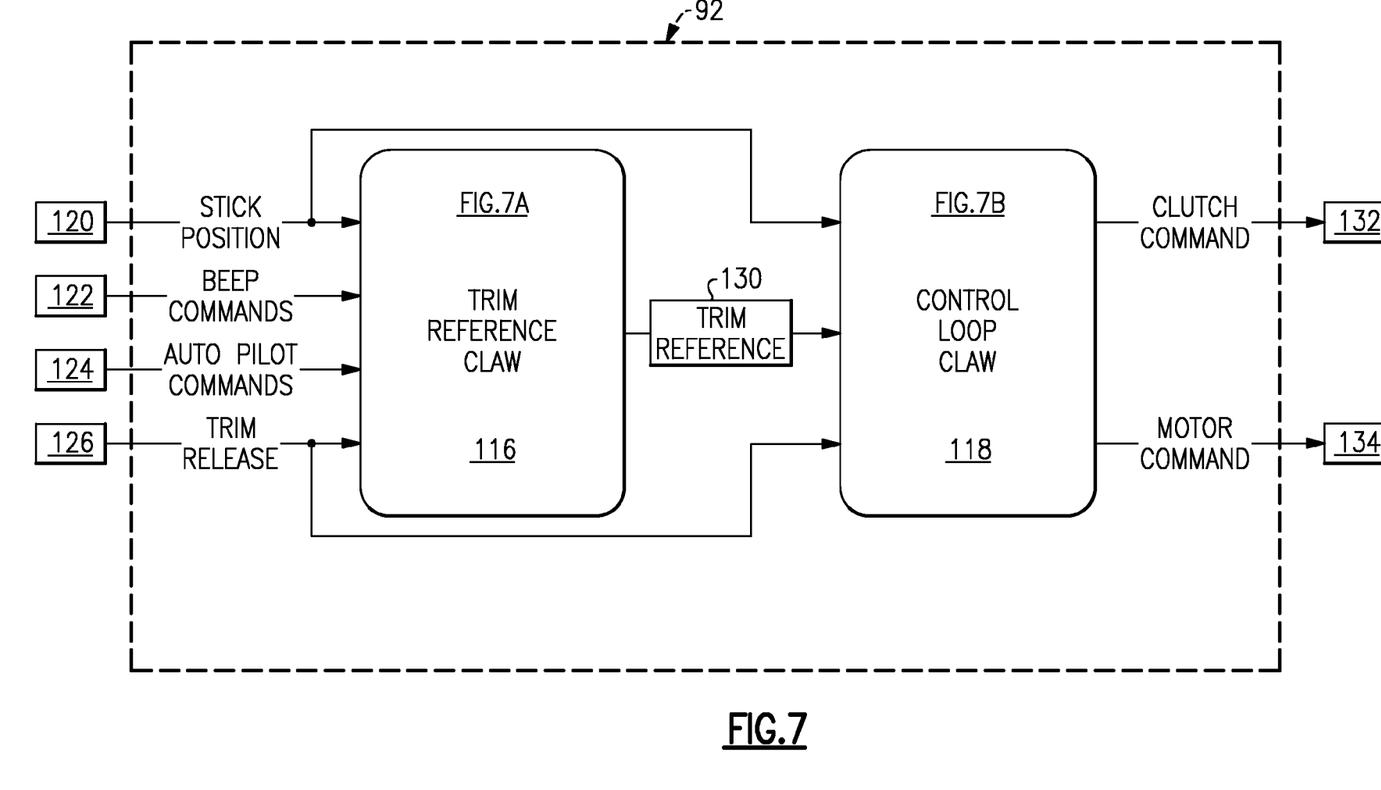
FIG. 7 is a schematic block diagram of a collective trim actuator algorithm (CTA)
Figure 7A:
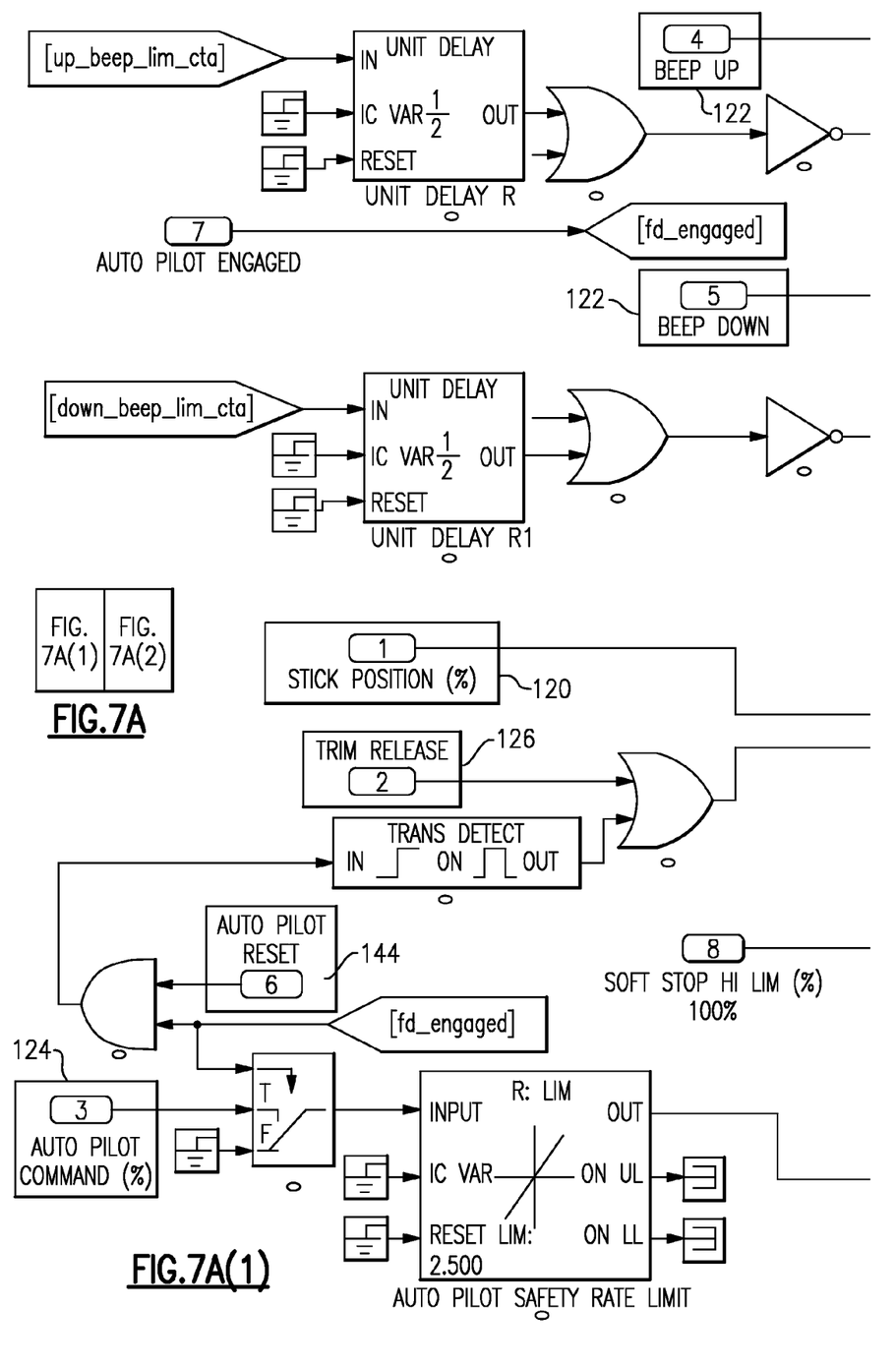
FIG. 7A is a schematic of a trim reference control law of the collective trim actuator algorithm (CTA) of FIG. 7.
Figure 7B:
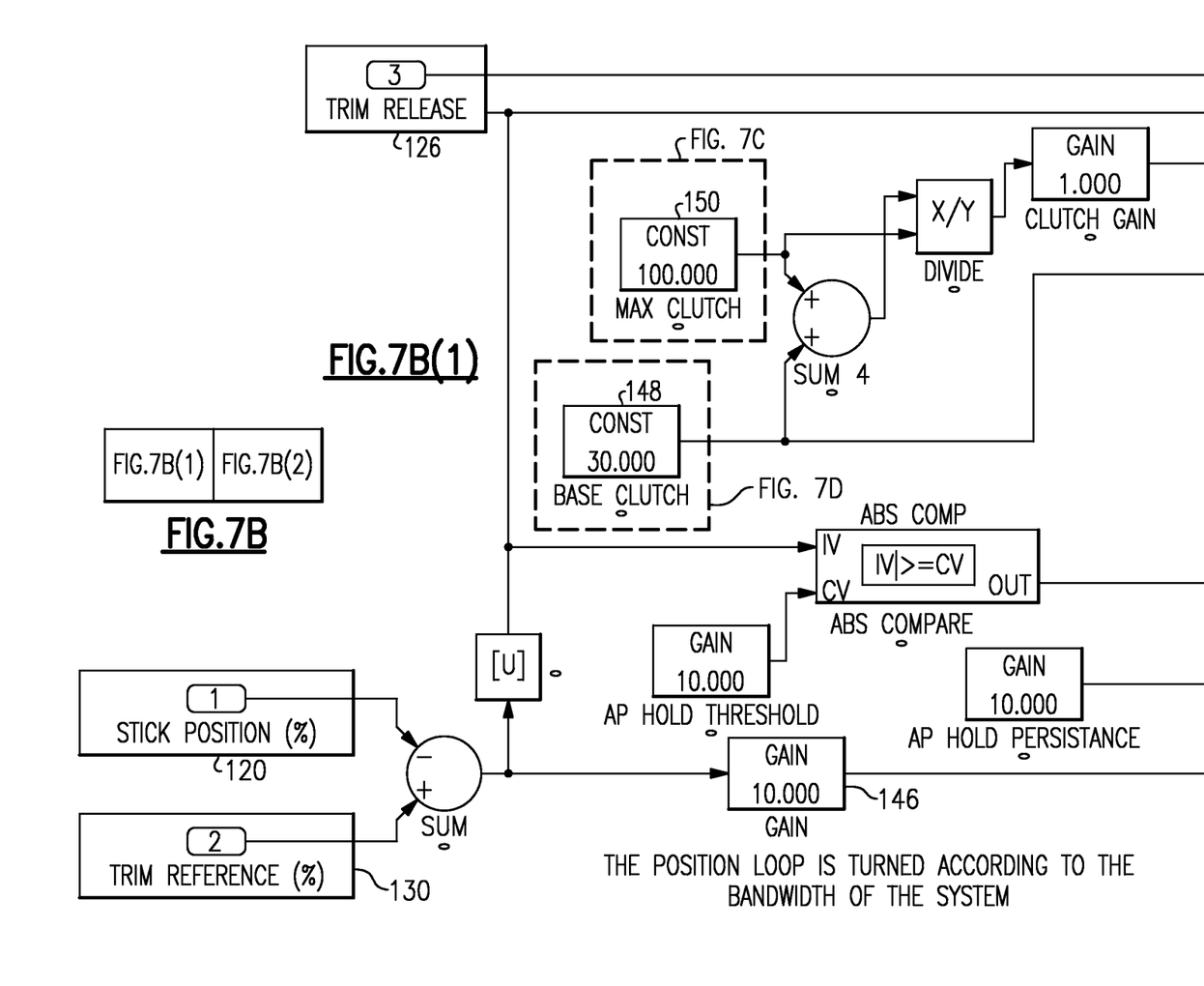
FIG. 7B is a schematic of a control loop control law of the collective trim actuator algorithm (CTA) of FIG. 7.

Referring to FIG. 7, the CTA 92 includes a trim reference control law 116 (also schematically illustrated in FIG. 7A) and a control loop control law 118 (also schematically illustrated in FIG. 7B). The trim reference control law 116 generates a trim reference for the collective stick position. The trim reference position is then utilized by the control loop control law 118 which drives the collective stick to the reference position while providing a force gradient in response to the stick distance displaced from the reference position.

The trim reference control law 116 receives inputs such as a stick position 120, beep command 122, a FACS command 124, and a trim release command 126. It should be understood that alternative or additional inputs may be provided. The stick position 120 and the trim release command 126 are communicated in parallel to the control loop control law 118. A trim reference command 130 output from the trim reference control law 116 is also communicated to the control loop control law 118. The control loop control law 118 thereby generates a clutch command 132 to drive the clutch 108 and a motor command 134 to drive the motor 106.

Referring to FIG. 7A, the trim reference control law 116 processes the beep commands 122 to drive an integrator 140. The limits into the integrator 140 may, in one-non-limiting embodiment, be modified to operate as soft stops for a force cueing capability which operates to cue the pilot for events other than stick motion, for example, flight envelope limits, environmental conditions, ground proximity, engine limits, stick shaking and the like through communication with the fly-by-wire flight control system. An adjustable beeper gain 142 determines, in percent per second (%/s), the rate of the integration. The integrator 140 is initialized (synchronized) to the current collective stick position when either trim release 102A is pressed or Auto Pilot reset 144 is requested. If the Auto pilot is engaged, the FACS 44 commands are summed to the output of the integrator 140 to generate a reference position in percent for communication to the control loop control law 118. In general, the trim reference control law 116 is controlled by the beeper switch 102B and provides a synchronized reference used by the FACS commands and the force limiting cues.

The module 90 also provides soft stops by limiting the trim reference such that the pilot cannot move the collective stick outside the bounds of the soft stops as determined by the CTA 92. The soft stops may be used by functions such as engine limiting, vertical speed hold and other collective autopilot modes. Further uses of this soft stop capability are described hereafter.

The soft stop or detent force may be commanded in variable levels according to cuing degree of effectiveness or severity of condition as well as indicator representative of the degree to which the pilot is resisting the cueing reference condition. Also, where the total force commanded to the collective stick may be the sum of cueing force components from various sources of position displacement from trim and proximity to any of several cueing reference values to include the logical selection or exclusion of any force component so as to prioritize the selected cueing reference.

Figure 7C:
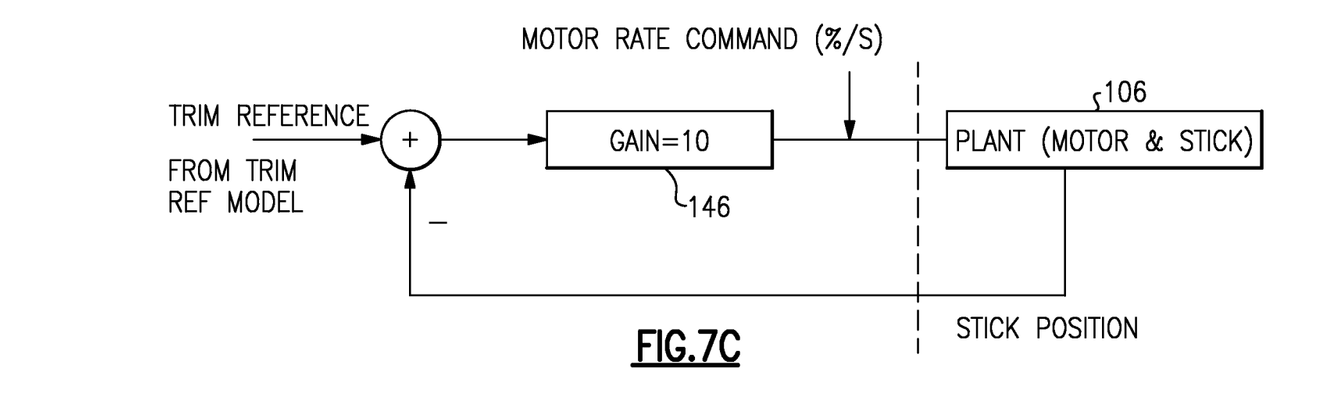
FIG. 7C is a simplified schematic of one section of the control loop control law which illustrates the motor command.
Figure 7D:
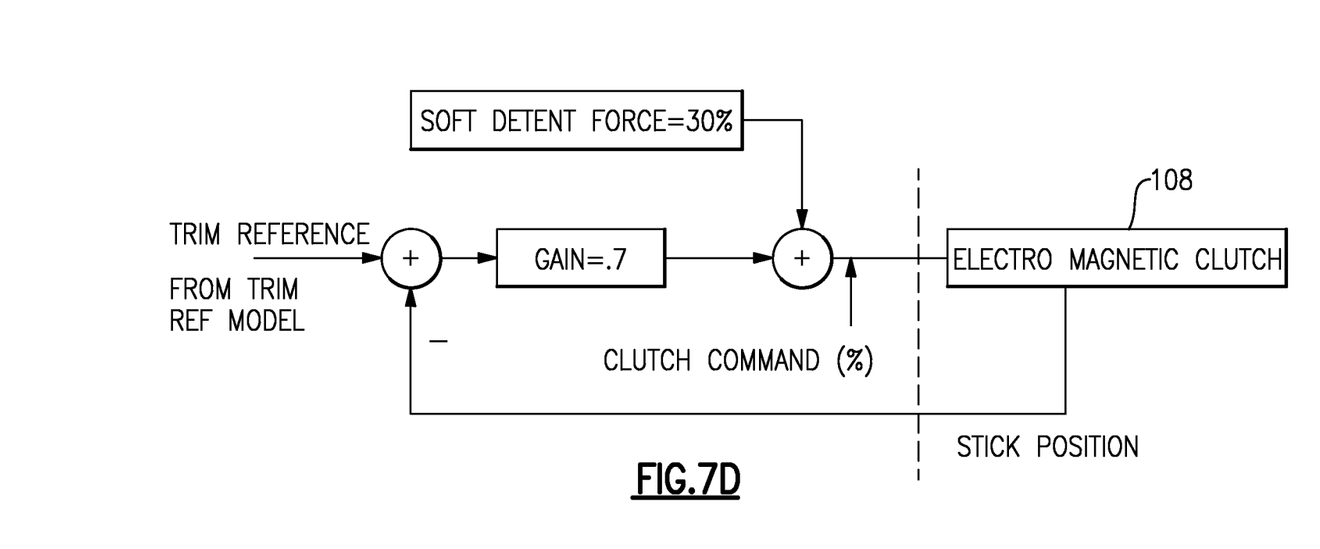
FIG. 7D is a simplified schematic of one section of the control loop control law which illustrates the clutch command, including a soft detent input.

Referring to FIG. 7B, the control loop control law 118 drives the collective stick 100 to the reference position provided by the trim reference control law 116. The control loop control law 118 provides a position loop gain 146 tuned in accords with the bandwidth of module 90. For example, if the required bandwidth of the module is 10 Hz, the gain of the control loop 118 is set according to $2 \times \pi \times 10$. The difference between the collective stick trim reference position and the current collective stick position also facilitates determination of the amount of clutch 108 that is applied to provide a force feel to the pilot (FIG. 7C). In one non-limiting embodiment, two adjustable gains for the clutch 108 are provided. A bias clutch gain 148 determines how much force is required for the trim detent force component. The trim detent force component is intended as a set directional breakout force when the stick is moved in either direction from the trim reference stick position. A force gradient gain 150 provides a spring like force feedback component when the collective stick 100 is moved from the reference position (FIG. 7D). These adjustable gains may be modified to the preference of the pilot.

In one non-limiting embodiment where torque measurement is available, a closed loop control of the clutch 108 may be implemented to ensure that a desired torque can be produced for pilot force cueing. The gains of the position control loop and the clutch control loop may be scheduled to provide more effective force feel to the pilots. In another non-limiting embodiment the position gain is scheduled through the use of position error as an auxiliary parameter for gain variation. If the error is large, meaning the pilot is pulling or pushing the stick far from the reference position, the gain is increased to make the motor respond faster, thus producing a more spring like force cueing to the pilots.

During FACS 44 flight modes when the collective stick is being commanded to control a lift mode of the aircraft, it is important to distinguish when the pilot intervenes with the FACS 44. This may be determined as a discrete that is calculated for the FACS 44 as the difference between the current stick position and the trim reference position. Although a force sensor could be used for this purpose, to indicate the force applied by the pilot, the present embodiment is intended to avoid the need for this device. Since the force applied to the collective stick by the CTA 92 is based on the displacement of the collective stick from the trim reference position, the determination of pilot intervention is sufficiently indicated by stick position relative to the reference position. The avoidance of a force sensing element is specifically possible in the cueing system described here. However, one advantage of the invention is that additional cueing forces can be directly commanded to the pilot by adding other cueing force components such as those based on load factor, engine performance, or other vehicle conditions. In more generalized cases of cueing force commands, the determination of pilot intervention may involve more considerations than stick position compared to reference position.

In general, the control loop control law 118 provides the force composed of the gradient gain 150 for a spring like force feedback when the collective stick 100 is moved from the reference position plus the bias clutch gain 148 which provides detent when trim release is not actuated. The spring force component provides a smoothly varying force as the collective stick is moved away from the trim reference for pilot-in-the-loop flight. The detent force component provides a positive trim reference position hold primarily for the FACS control of the collective stick position for automatic control modes. Additionally, cueing force components can be commanded related to stick positional damping, or other vehicle conditions. While the CTA 92 commands these primary force cueing commands, the CTA 92 also provides smooth transition of cueing functions so as not to result in discontinuities perceived by the pilot.

Because there are no actual physical spring devices in the system, removal of the cueing force does not result in removal of stored energy and related adverse jump or inertial rebound force effects to the pilot. Such effects have been problematic in conventional spring-based trim gradient actuators and require corrective procedures in flight operations. Such adverse force effects can typically occur if the pilot actuates a trim release to remove the stick force while the stick is displaced away from the trim reference position and the spring is storing a force level. The invention removes the commanded force with a smoothing function compatible with the pilot perceived feel. This avoids undesirable pilot reaction to sudden force remove and rebound to facilitate smooth and continuous control position. The CTA 92 in hands-off operation provides positioning loop closure of the collective stick position to maintain the stick at the reference position, such as when the reference position is under automatic control by the FACS. When the collective stick is under automatic FACS control it is important that the stick follow the commanded position precisely. This is accomplished by the trim motor 106 positioning loop closure together with the detent force component which is designed to be sufficient to overcome physical forces opposing motion such as friction and unbalanced stick weight, while also not supplying overly large breakout forces to the pilot-in-the-loop operation.

Figure 8:
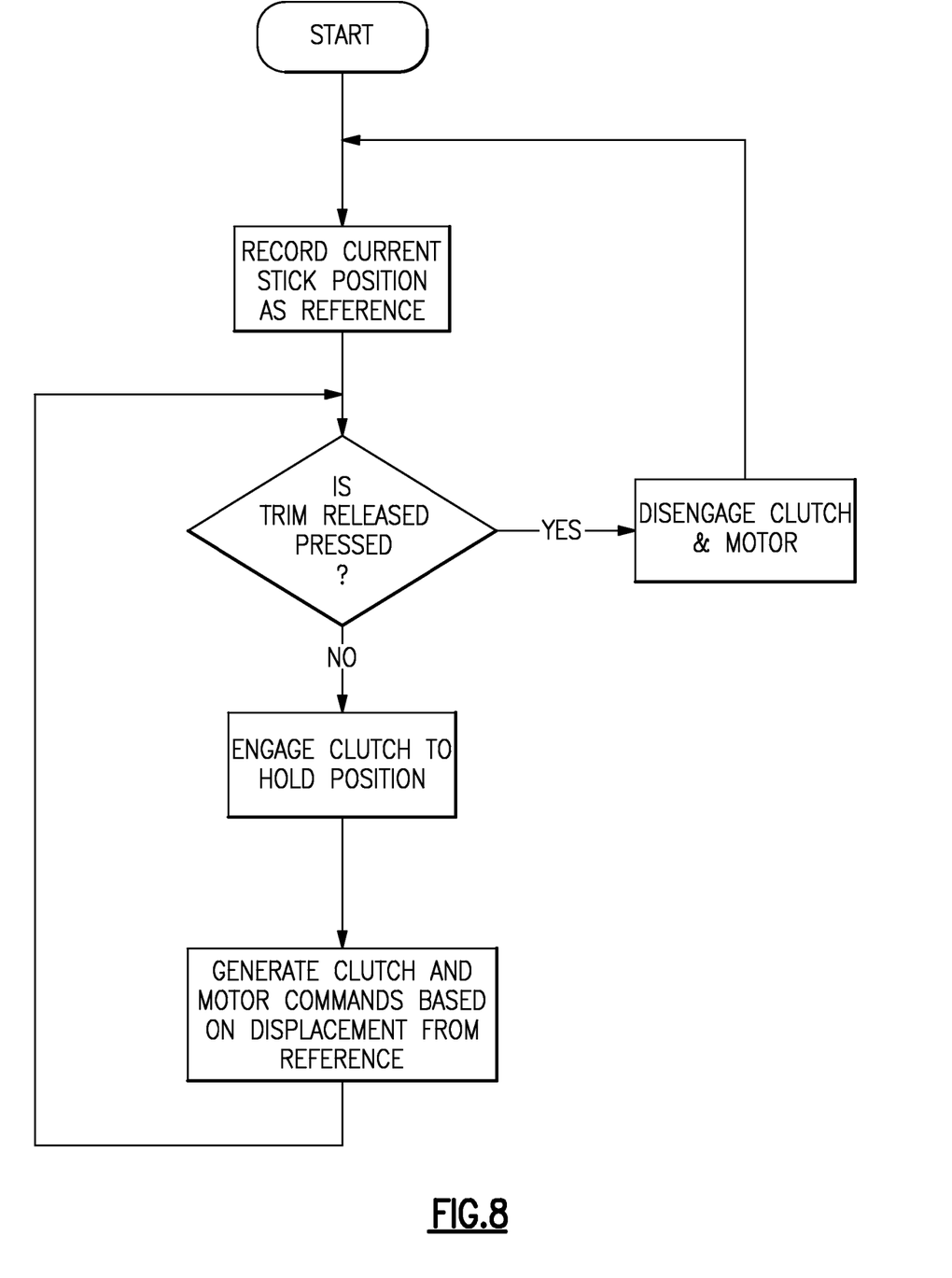
FIG. 8 is a flowchart illustrating operation of the collective stick.

In operation and with reference to FIG. 8, the pilot operates the collective controller 46 to change the collective blade angles that essentially control the vertical rate of the aircraft. For this purpose, the collective stick 100 must provide accurate cues to the pilot in terms of force feedback.

The collective stick 100 is initialized at a current collective position to record the current position as the trim reference position. The trim reference may change if trim release is engaged, the reference is "beeped" by using the trim switch 102B, or the FACS 42 is commanding the flight control system. When the collective stick 100 is moved without trim release being actuated, the drive system 114 reacts with a force proportional to the displacement of the collective stick 100. That is, the motor 106 is commanded to drive the collective stick 100 back toward the trim reference position.

The drive system 114 facilities Fly-By-Wire flight control to cue the pilots. The pilots are provided with a spring-like feel indicative of collective stick 100 displacement from the trim reference position. No force sensors are required as the force feedback is determined and provided with only the collective stick position sensor 112, the motor 106 and the clutch 108.

The collective controller 46, through communication with the FACS 42, facilitates force cueing to the pilots through soft stops which may indicate various events other than stick motion. For example, the collective trim force capability can be used to cue the pilot as to flight envelope limits, environmental conditions, ground proximity, engine limits, brownouts, DVE (Degraded Visual Environment) operations and the like. For example, if a capability is desired to cue the pilot to lower the collective in response to an engine limit region, a soft stop type force can be commanded in the down direction by applying a clutch engage force level and movement of the trim reference, or a secondary component may be summed to the nominal reference, in the down direction. That way, the pilot must resist the force level of the clutch in order to overpower the down cueing command. When or if the pilot relaxes and the stick moves down the commanded amount, the pilot will perceive the force subside as the desired response occurs to satisfy the cueing objective i.e. alleviate operating near the engine limit. In the same example, the magnitude of the cueing force can be modulated in response to severity and priority of the condition by modulating the clutch engagement command in proportion to the desired cue force. The mathematical equation for the soft stop cue force may also be modulated so as to define a gradient relative to the intended cue reference such that a relatively small force is encountered initially then builds as proximity to the limit value is neared.

This type of cueing is accomplished without need for a force sensing device because the force applied to the collective stick is controlled by, and is in proportion to, the degree of commanded clutch engagement in the direction to resist the speed the motor is commanded to move. Force cuing and the ability to provide soft stops have many implications for reducing pilot workload in a high work load environment because stick force cuing supplements, or removes reliance upon, the need for the pilot to closely monitor secondary display cues within the cockpit such as torque or collective position indicators. Although such force cueing does not eliminate the need for the cockpit display cues of specific conditions, the stick force cueing provides a measure of indication that reduces the need for continuous and direct monitoring of the cockpit displays and enables the pilot to concentrate proportionately more on higher level mission tasks, or proportionately enable more "eyes out of the cockpit" concentration.

In comparison with current technology, the collective controller 46 provides superior weight savings, advanced pilot cuing, reduced component failure criticality, and higher reliability than active sticks and other conventional full authority force cueing systems (such as FAS) because potential actuator runaway conditions are determined by intrinsic equipment characteristics (maximum motor speed) and so are readily controlled. For example, FAS provides a directly commandable force, but requires a full authority and high rate hydraulic force actuation subsystem that in turn requires fault criticality considerations in the system design. The collective controller 46 also accomplishes these tasks without any sort of force sensor yet still provides a true spring like force approximation.

The collective controller 46 avoids the energy dissipation jump problem and enables generalized force cueing capability. The collective controller 46 also permits direct, specific, and large force cues to be applied while the failure mode can be limited to a benign maximum runaway motor speed that is within conventional inherently limited criteria. This way, flight criticality can be reduced or avoided in the control law software and hardware design.

It should be understood that like reference numerals identify corresponding or similar elements throughout the several drawings. It should also be understood that although a particular component arrangement is disclosed in the illustrated embodiment, other arrangements will benefit from the subject invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A flight control system comprising:
   a control inceptor;
   a clutch engageable with said control inceptor;
   a motor engageable with said control inceptor; and
   a module comprising a trim reference control law in communication with a control loop control law, said trim reference control law operable to generate a trim reference position for said control inceptor, said trim reference position utilized by said control loop control law to control a speed of said control inceptor toward said trim reference position with said motor and generate a force gradient with said clutch.

2. The system as recited in claim 1, further comprising a position sensor in communication with said control inceptor and said module, said position sensor operable to determine a current position of said control inceptor.

3. The system as recited in claim 2, further comprising a Primary Flight Control System (PFCS) and an Automatic Flight Augmentation and Cueing System (FACS) in communication with said position sensor.

4. The system as recited in claim 3, wherein said PFCS is in communication with said module through a Low Pass Filter in response to a control inceptor rate requirement in response to a required stick movement rate.

5. The system as recited in claim 1, wherein said control inceptor is a collective stick.

6. The system as recited in claim 1, further comprising a position sensor in communication with said control inceptor and said module, said position sensor operable to determine a current position of said control inceptor such that said force gradient is determined in response to said current stick position relative said trim reference position.

7. The system as recited in claim 6, wherein said force gradient defines a bias clutch gain which defines a force required to move said control inceptor out of a soft detent.

8. The system as recited in claim 7, wherein said soft detent is referenced to a non-control inceptor motion function.

9. The system as recited in claim 7, wherein said soft detent is referenced to an Automatic Flight Augmentation and Cuing Cueing System (FACS).

10. The system as recited in claim 7, wherein said soft detent is referenced to a flight related event.

11. The system as recited in claim 7, wherein said soft detent is referenced to a ground proximity event.

12. The system as recited in claim 6, wherein said force gradient defines a force gradient gain which defines a spring-like linear force feedback to move said control inceptor from said reference position.

13. The system as recited in claim 1, wherein said trim reference control law receives a stick position command, a beep command, an autopilot command and a trim release command to generate a trim reference output to said control loop control law.

14. The system as recited in claim 13, wherein said control loop control law receives said stick position command, said trim release command and said trim reference command to generate a clutch command to said clutch and a motor command to said motor.

15. A method of flight control comprising:
   recording a current position of a control inceptor as a trim reference position;
   generating a clutch command to hold the control inceptor at the trim reference position; and
   generating a motor speed command in response to movement of the control inceptor from the trim reference position.

16. A method as recited in claim 15, further comprising resetting the clutch command and the motor command in response to a trim release command.

17. A method as recited in claim 15, wherein the clutch command comprises a force gradient gain to the clutch to provide a spring-like linear force feedback to move the control inceptor from the trim reference position.

18. A method as recited in claim 15, wherein the clutch command comprises a force gradient gain to the clutch to provide a damping rate force component.

19. A method of flight control comprising:
   recording a current position of a control inceptor as a trim reference position;
   generating a clutch command to hold the control inceptor at the trim reference position, wherein the clutch command comprises a bias clutch gain to the clutch to provide a force required to move the control inceptor out of a soft detent; and
   generating a motor speed command in response to movement of the control inceptor from the trim reference position.

20. A method as recited in claim 19, wherein the soft detent is referenced to a non-control inceptor motion function.

21. A method as recited in claim 20, wherein the soft detent is referenced to an Automatic Flight Augmentation and Cueing System (FACS).

* * * * *